US010684623B2

(12) United States Patent
Tiwari et al.

(10) Patent No.: US 10,684,623 B2
(45) Date of Patent: Jun. 16, 2020

(54) METHOD FOR DETECTING AND RESPONDING TO SPILLS AND HAZARDS

(71) Applicant: Simbe Robotics, Inc., San Francisco, CA (US)

(72) Inventors: Durgesh Tiwari, San Francisco, CA (US); Bradley Bogolea, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 0 days.

(21) Appl. No.: 16/245,117

(22) Filed: Jan. 10, 2019

(65) Prior Publication Data

US 2019/0235511 A1 Aug. 1, 2019

Related U.S. Application Data

(60) Provisional application No. 62/615,804, filed on Jan. 10, 2018.

(51) Int. Cl.
*G05D 1/02* (2020.01)
*G01N 21/27* (2006.01)
(Continued)

(52) U.S. Cl.
CPC ........... *G05D 1/0214* (2013.01); *G01B 21/18* (2013.01); *G01B 21/28* (2013.01); *G01N 21/27* (2013.01);
(Continued)

(58) Field of Classification Search
CPC ......... G05D 1/0214; G05D 2201/0207; G05D 1/0088; G05D 1/0212; G01B 21/28;
G01B 21/18; G06T 7/55; G06T 7/70; G06T 7/0002; G06T 7/62; G06T 2207/10016; G06T 2207/10048; G06T 7/90; G06T 7/97; G06T 2207/10024; G06K 9/00664;
(Continued)

(56) References Cited

U.S. PATENT DOCUMENTS 6,124,694 A * 9/2000 Bancroft .............. G05D 1/0255
318/587
6,812,846 B2 * 11/2004 Gutta ....................... G06T 7/97
340/603
(Continued)

FOREIGN PATENT DOCUMENTS

WO 2017194962 A1 11/2017

*Primary Examiner* — Angelina Shudy
*Assistant Examiner* — Mohamed Abdo Algehaim
(74) *Attorney, Agent, or Firm* — Run8 Patent Group, LLC; Peter Miller

(57) ABSTRACT

One variation of a method for detecting and responding to hazards within a store includes: autonomously navigating toward an area of a floor of the store; recording a thermal image of the area; recording a depth map of the area of the floor; detecting a thermal gradient in the thermal image; scanning a region of the depth map, corresponding to the thermal gradient detected in the thermal image, for a height gradient; in response to detecting the thermal gradient in the thermal image and in response to detecting absence of a height gradient in the region of the depth map, predicting presence of a fluid within the area of the floor; and serving a prompt to remove the fluid from the area of the floor of the store to a computing device affiliated with the store.

19 Claims, 4 Drawing Sheets

(51) Int. Cl.
*G06Q 10/08* (2012.01)
*G06T 7/00* (2017.01)
*G06K 9/62* (2006.01)
*G06K 9/00* (2006.01)
*G06T 7/62* (2017.01)
*G06T 7/70* (2017.01)
*G06T 7/55* (2017.01)
*G06T 7/90* (2017.01)
*G01V 9/00* (2006.01)
*G01B 21/18* (2006.01)
*G01B 21/28* (2006.01)
*G01N 25/00* (2006.01)

(52) U.S. Cl.
CPC ............ *G01N 25/00* (2013.01); *G01V 9/005* (2013.01); *G06K 9/00664* (2013.01); *G06K 9/6202* (2013.01); *G06Q 10/087* (2013.01); *G06T 7/0002* (2013.01); *G06T 7/55* (2017.01); *G06T 7/62* (2017.01); *G06T 7/70* (2017.01); *G06T 7/90* (2017.01); *G06T 7/97* (2017.01); *G05D 2201/0207* (2013.01); *G06T 2207/10016* (2013.01); *G06T 2207/10024* (2013.01); *G06T 2207/10048* (2013.01)

(58) Field of Classification Search
CPC ...... G06K 9/6202; G01N 25/00; G01N 21/27; G01V 9/005; G06Q 10/087; G06Q 10/06; G06Q 10/0631; B25J 11/0085; B25J 11/008; B25J 11/0075; B25J 13/083; B25J 19/0058; B25J 5/00
USPC .......................................................... 701/23
See application file for complete search history.

(56) References Cited

U.S. PATENT DOCUMENTS

| | | | | |
|---|---|---|---|---|
| 8,189,855 B2* | 5/2012 | Opalach | ............... | G06Q 10/087 382/100 |
| 9,977,965 B1* | 5/2018 | Parikh | ............... | G06K 9/00677 |
| 9,987,752 B2* | 6/2018 | Fisher | ............... | G08B 21/20 |
| 10,071,891 B2* | 9/2018 | High | ............... | B07C 5/28 |
| 10,189,692 B2* | 1/2019 | High | ............... | G06Q 10/30 |
| 10,274,325 B2* | 4/2019 | Rombouts | ............... | G01C 21/32 |
| 10,293,485 B2* | 5/2019 | Sinyayskiy | ......... | A47L 11/4061 |
| 10,328,769 B2* | 6/2019 | Ferguson | ............ | G01C 21/3438 |
| 10,331,124 B2* | 6/2019 | Ferguson | ............... | G08G 1/143 |
| 10,354,131 B2* | 7/2019 | Kuwabara | ............ | G06Q 30/0261 |
| 10,373,116 B2* | 8/2019 | Medina | .................. | B25J 9/1697 |
| 10,373,470 B2* | 8/2019 | Badawy | .................. | G06T 7/254 |
| 10,377,040 B2* | 8/2019 | Sinyayskiy | ............. | B25J 9/1666 |
| 10,387,897 B2* | 8/2019 | Sakata | ...................... | G07G 1/14 |
| 2003/0063006 A1* | 4/2003 | Gutta | ...................... | G06T 7/254 340/603 |
| 2013/0325325 A1* | 12/2013 | Djugash | ............... | G08G 1/0141 701/425 |
| 2014/0320265 A1* | 10/2014 | Jones | ................. | G06Q 10/0833 340/10.1 |
| 2015/0205299 A1* | 7/2015 | Schnittman | ........... | G05D 1/0219 701/26 |
| 2015/0213299 A1* | 7/2015 | Solano Ferrandez | ........................ | G06T 7/0008 382/103 |
| 2015/0262118 A1* | 9/2015 | Grissom | ............... | G06Q 10/087 700/216 |
| 2015/0317357 A1* | 11/2015 | Harmsen | ............... | G06N 5/025 707/723 |
| 2015/0362921 A1* | 12/2015 | Hanaoka | ................ | G01B 11/24 701/23 |
| 2016/0057925 A1* | 3/2016 | Letsky | ................. | A01D 34/008 701/23 |
| 2016/0259340 A1* | 9/2016 | Kay | ......................... | B60P 3/06 |
| 2016/0270618 A1* | 9/2016 | Lu | ....................... | A47L 11/4061 |
| 2016/0287044 A1* | 10/2016 | Tanaka | ................ | A47L 9/2857 |
| 2017/0193434 A1 | 7/2017 | Shah et al. | | |
| 2017/0286773 A1* | 10/2017 | Skaff | ............... | G05D 1/0246 |
| 2017/0292917 A1* | 10/2017 | O'Dell | ................... | G08B 21/12 |
| 2017/0293880 A1* | 10/2017 | Taylor | .................. | G06Q 10/087 |
| 2017/0300847 A1* | 10/2017 | Jones | ................... | G07G 1/0036 |
| 2017/0329333 A1* | 11/2017 | Passot | ................. | A47L 11/4011 |
| 2017/0337508 A1 | 11/2017 | Bogolea et al. | | |
| 2017/0355081 A1* | 12/2017 | Fisher | ...................... | H04N 5/33 |
| 2018/0120116 A1* | 5/2018 | Rombouts | ............... | G01C 21/32 |
| 2018/0225620 A1* | 8/2018 | Cantrell | ......... | G06Q 10/063112 |
| 2019/0080277 A1* | 3/2019 | Trivelpiece | ........ | G06K 9/00771 |
| 2019/0200510 A1* | 7/2019 | Chrysanthakopoulos | .................... | A01B 59/043 |
| 2019/0213212 A1* | 7/2019 | Adato | ...................... | G06T 7/75 |
| 2019/0249998 A1* | 8/2019 | Rombouts | ............. | G01C 21/32 |
| 2019/0325379 A1* | 10/2019 | Medina | ............... | A47L 11/4061 |

* cited by examiner ated to U.S. patent application Ser. No. 15/600,527, filed on 19 May 2017, and to U.S. patent application Ser. No. 15/347,689, filed on 9 Nov. 2016, each of which is incorporated in its entirety by this reference.

METHOD FOR DETECTING AND RESPONDING TO SPILLS AND HAZARDS

CROSS-REFERENCE TO RELATED APPLICATIONS

This Application claims the benefit of U.S. Provisional Patent Application No. 62/615,804, filed on 10 Jan. 2018, which is incorporated in its entirety by this reference.

This Application is related to U.S. patent application Ser. No. 15/600,527, filed on 19 May 2017, and to U.S. patent application Ser. No. 15/347,689, filed on 9 Nov. 2016, each of which is incorporated in its entirety by this reference.

TECHNICAL FIELD

This invention relates generally to the field of spill detection and more specifically to a new and useful method for detecting and responding to spills in the field of spill detection.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
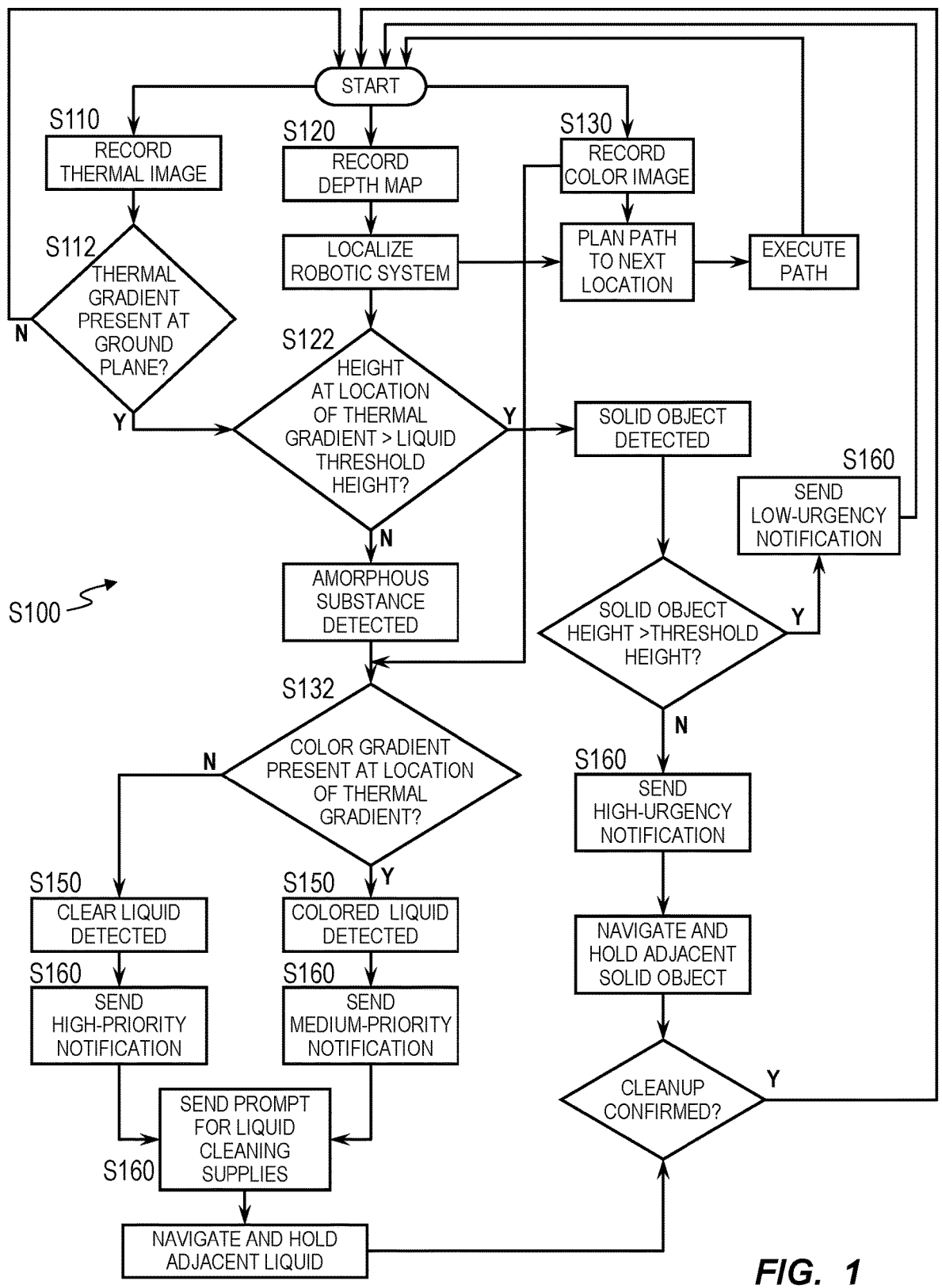
FIG. 1 is a flowchart representation of a method.

As shown in FIG. 1, a method S100 for detecting and responding to hazards within a store includes, at a robotic system, during a scan cycle: autonomously navigating toward an area of a floor of the store in Block S102; recording a thermal image of the area of the floor in Block S110; recording a depth map of the area of the floor in Block S120; detecting a thermal gradient in the thermal image in Block S112; and scanning a region of the depth map, corresponding to the thermal gradient detected in the thermal image, for a height gradient in Block S122. The method S100 further includes, in response to detecting the thermal gradient in the thermal image and in response to detecting absence of a height gradient in the region of the depth map: predicting presence of a fluid within the area of the floor in Block S150; and serving a prompt to remove the fluid from the area of the floor of the store to a computing device affiliated with the store in Block S160.

One variation of the method S100 shown in FIG. 1 includes, at a robotic system, during a scan cycle while autonomously navigating throughout the store: recording a thermal image of an area of a floor of the store in Block S110; recording a depth map of the area of the floor in Block S120; recording a color image of the area of the floor in Block S130; detecting a thermal gradient in the thermal image in Block S112; scanning a region of the depth map, corresponding to the thermal gradient detected in the thermal image, for a height gradient in Block S122; and scanning a region of the color image, corresponding to the thermal gradient in the thermal image, for a color gradient in Block S132; In this variation, the method S100 also includes, in response to detecting the thermal gradient in the thermal image, in response to detecting absence of a height gradient in the region of the depth map, and in response to detecting absence of the color gradient in the region of the depth map: predicting presence of a clear fluid within the area of the floor in Block S150; and serving the prompt specifying a first priority to remove the clear fluid from the area of the floor of the store to the computing device in Block S160. In this variation, the method S100 can also include, in response to detecting the thermal gradient in the thermal image, in response to detecting absence of a height gradient in the region of the depth map, and in response to detecting the color gradient in the region of the depth map: predicting presence of a colored fluid within the area of the floor in Block S150; and serving an electronic notification specifying a second priority to remove the colored fluid from the area of the floor of the store to the computing device, the second priority less than the first priority.

Figure 2:
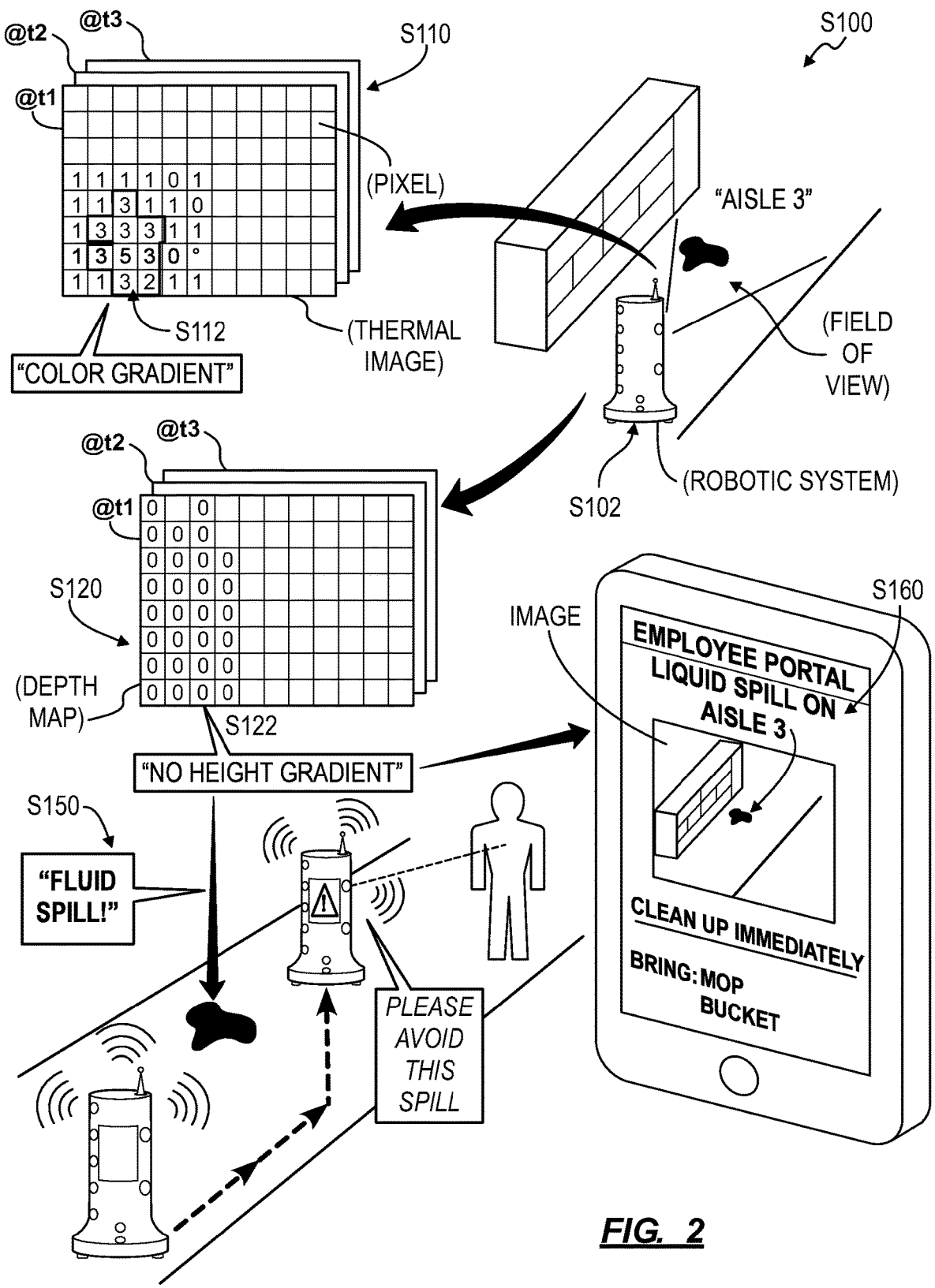
FIG. 2 is a flowchart representation of one variation of the method.

Another variation of the method S100 shown in FIG. 2 includes, at a robotic system, while autonomously navigating within the store during a scan cycle: recording a thermal image of the area of the floor of the store in Block S110; recording a depth map of the area of the floor in Block S120; scanning the thermal image for a thermal disparity in Block S112; and scanning the depth map for a height disparity in Block S122. This variation of the method S100 also includes: in response to detecting a thermal disparity in a first region of the thermal image and in response to detecting absence of a height disparity in a second region of the depth map spatially aligned with the first region of the thermal image, predicting presence of a fluid within the area of the floor in Block S150; and, in response to predicting presence of the fluid within the area of the floor, serving a prompt to remove the fluid from the area of the floor of the store to a computing device affiliated with the store in Block S160.

2. Applications

Generally, Blocks of the method S100 can be executed by a system (e.g., a robotic system and/or a remote computer system): to autonomously navigate throughout a store (e.g., a grocery store, a sporting goods store, a clothing store, a home improvement store, etc.); to capture depth, thermal, and color image data of floor areas throughout the store; to detect fluid spills (and/or other obstacles or hazards) on the floor of the store based on a combination of these depth, thermal, and color image data; and to automatically prompt an associate of the store (e.g., an employee, custodian, or manager) to clean up the spill (or remove the hazard) from the floor of the store. In particular, the robotic system and/or the remote computer system can automatically execute Blocks of the method S100 during store hours in order to detect fluid spills and other obstacles on the floor throughout the store and to selectively inform store staff of such fluid spills and other obstacles, thereby enabling store staff to: quickly comprehend presence of such hazards (e.g., even clear fluid spills, such as oil or water on a linoleum floor, which may be difficult for a human to visually discern); quickly allocate resources to clear these hazards; and thus reduce risk of falls, injuries, or other incidents involving patrons of the store.

For example, the robotic system can include a thermographic (or "thermal imaging") camera, a color image (e.g., "RGB") camera, and a depth sensor (e.g., a scanning LIDAR or RADAR sensor) defining overlapping fields of view and arranged at known locations on the robotic system. The robotic system can therefore automatically collect thermal images, color images, and/or depth maps of floor space nearby while navigating autonomously throughout the store, such as while executing an inventory tracking routine described in U.S. patent application Ser. No. 15/600,527. The robotic system (or the remote computer system) can then execute Blocks of the method S100 to: identify a thermal gradient (or temperature disparity) over a region of a thermal image recorded by the robotic system at a first time when facing a particular floor area within the store; scan a depth map recorded at approximately the first time by the robotic system for a height gradient (or height disparity) in a region cospatial with the thermal gradient in the concurrent thermal image; and then interpret presence of the thermal gradient and lack of (significant) cospatial height gradient as a spill (e.g., spilled water, pasta, soda, oil, or rice) within the particular area of the floor of the store depicted in this thermal image and the concurrent depth map. In this example, the robotic system (or the remote computer system) can also scan a color image recorded at approximately the first time by the robotic system for a color gradient (or color disparity) in a region cospatial with the thermal gradient. If the robotic system detects such a color gradient, the robotic system can identify the spill as visually discernible (e.g., brown soda, red tomato sauce). However, if the robotic system detects lack of such a color gradient, the robotic system can identify the spill as not visually discernible or "clear" (e.g., water, oil).

The robotic system (or the remote computer system) can then immediately notify a store associate of the location and characteristics of the spill (e.g., spill size, predicted spill material, suggested cleanup material, cleanup urgency, etc.), such as by sending a notification containing these data to a mobile computing device assigned to the store associate. Concurrently, the robotic system can halt near the detected spill (e.g., to function as a caution cone) and warn nearby patrons of the spill, such as by rendering a warning on an integrated display, activating an integrated strobe light, and/or outputting an audible alarm through an integrated speaker.

The robotic system (and the computer system) can: repeat this process for each set of concurrent thermal, depth, and color images recorded by the robotic system while traversing the store; detect spills; and selectively return prompts to clean these spills to store associates accordingly. Simultaneously, the robotic system can record thermal, depth, and/or depth images of shelving structures, refrigeration units, displays, etc. in the store; and the robotic system of the remote computer system can process these images—such as described in U.S. patent application Ser. No. 15/600,527—to detect products stocked throughout the store and to generate a restocking list and/or update an inventory record for the store.

The robotic system can therefore combine multiple sensor streams recorded by discrete sensors integrated into the robotic system to: detect and avoid obstacles while navigating autonomously throughout the store; track product inventory throughout the store; identify whether spills (and/or other unintended obstacles) are present within the store; and automatically dispatch an associate of the store to clear such obstacles within the store, thereby freeing associates to perform tasks other than spill observation while also limiting time and increasing accuracy with which such obstacles are detected and cleared.

In particular, the robotic system can: record thermal, depth, and/or color images of various locations of a store during navigation of a robotic system within the store; identify hazards on a floor of a store through the thermal, depth, and/or color images; extract characteristics about these hazards from thermal, depth, and/or color images of the object; and issue relevant prompts to store associates to address the hazard efficiently (e.g., with a limited number of trips between a stock-room and the location of the hazard or a short duration between transmission of the prompt and removal of the hazard). Thus, the robotic system can limit a time window during which patrons of the store may be at risk for falling, slipping, etc. due to presence of the hazard and/or may be inconvenienced by avoiding the hazard.

The robotic system is described herein as navigating and identifying obstacles within a store, such as a grocery store. However, the robotic system can be deployed within any other facility (e.g., a storage warehouse, a sporting goods store, a clothing store, a home improvement store, and/or a grocery store), and the remote computer system can dispatch the robotic system to execute scan cycles within this facility in any other way. Additionally, the robotic system described herein is configured to execute Blocks of the method S100 to identify and prompt an associate to clear spills and/or hazards on a floor of the store. However, the robotic system can identify and prompt any other user to clear any other obstacle on the floor of the store or otherwise obstructing (or limiting) passage through aisles and/or other regions of the store.

Furthermore, the method S100 is described herein as executed by a remote computer system (e.g., a remote server). However, Blocks of the method S100 can be executed by one or more robotic systems placed in a store (or warehouse, etc.), by a local computer system, or by any other computer system—hereinafter a "system." Blocks of the method S100 are also described herein as executed locally by the robotic system to locally process scan data in order to detect and respond to hazards (e.g., fluids, objects) on the floor of a store. However, the robotic system can also upload scan data (e.g., thermal images, depth maps, color images) to a remote computer system—such as over a cellular network or local area network—for remote processing and hazard detection.

3. Robotic System

Figure 3:
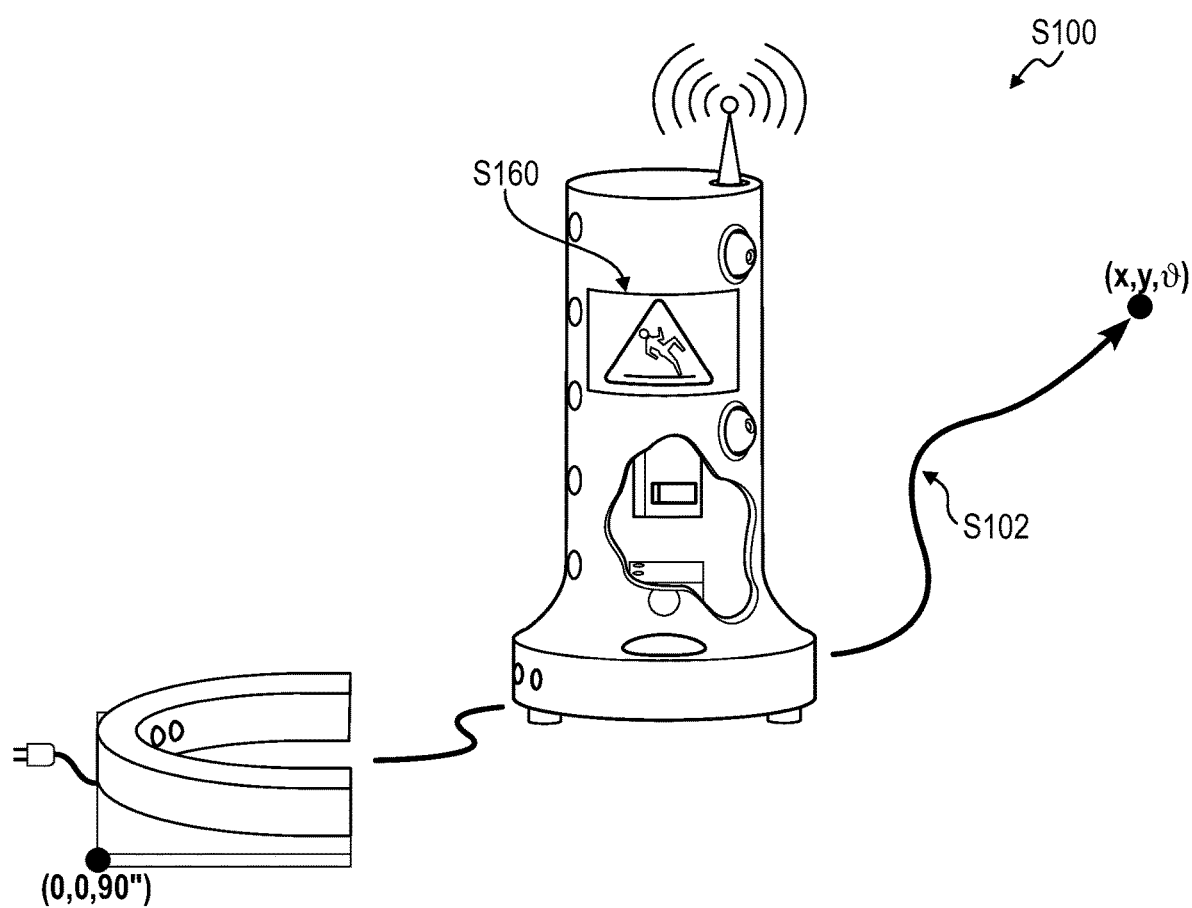
FIG. 3 is a schematic representation of one variation of the method.

As shown in FIG. 3, a robotic system executes Blocks of the method S100 to autonomously navigate throughout a store, scan inventory structures throughout the store, detect spills and/or hazards, and communicate inventory and hazard-related data back to a remote computer system and/or to an associate of the store.

In one implementation, the robotic system defines a network-enabled mobile robotic platform including: a base; a drive system (e.g., a pair of two driven wheels and two swiveling castors) arranged in the base; a power supply (e.g., an electric battery); a set of depth sensors (e.g., forward- and rear-facing scanning LIDAR or RADAR sensors); a processor that transforms data collected by the depth sensors into two- or three-dimensional maps of a space around the robotic system; a mast extending vertically from the base; a set of cameras arranged on the mast and facing laterally outward from one or both sides of the mast; a geospatial position sensor (e.g., a GPS sensor); and/or a wireless communication module that downloads waypoints and a master map of a store from a remote computer system (e.g., a remote server) and that uploads images captured by the cameras and maps generated by the processor to the remote computer system.

The robotic system can also include a forward-facing thermographic camera and a forward-facing color camera, both defining a field of view that intersects a floor surface near (e.g., just ahead of) the robotic system and that intersects a field of view of the forward-facing depth sensor. Thus, as the robotic system navigates autonomously down an aisle within the store during an inventory tracking routine, the robotic system can: scan the aisle with the depth sensor to generate a depth map of the aisle and adjacent structures; localize itself within the store and within the aisle in particular based on the depth map; record color images of inventory structures on both sides of the aisle via laterally-facing cameras on the mast; and record thermal images and color images of the floor area ahead of the robotic system. The robotic system can then implement Blocks of the method S100 described below to fuse the depth map, thermal images, and color images (recorded by the forward-facing camera) to detect spills and other hazards ahead of the robotic system.

Alternatively, the robotic system can include a forward-facing color camera and a forward-facing thermographic camera. During an inventory tracking routine, the robotic system can: navigate to a waypoint adjacent an inventory structure in the store; rotate to an angular position specified in the waypoint to align the forward-facing color camera and a forward-facing thermographic camera to the inventory structure; record a color image and/or a thermal image of the inventory structure; rotate to face perpendicular to the inventory structure; and record color and thermal images of the floor area ahead via the forward-facing color camera and a forward-facing thermographic camera while navigating to a next waypoint. The robotic system (or the remote computer system) can then execute Blocks of the method S100 described below to fuse these color images, thermographic images, and depth map data collected between these two waypoints to detect a spill or other hazard on the floor area between or near these waypoints.

In this implementation, the robotic system can also include thermographic, depth, and/or color cameras mounted statically to the mast, such as two vertically offset cameras on a left side of the mast and two vertically offset cameras on the right side of mast, or integrated into the base. The robotic system can additionally or alternatively include articulable cameras, such as: a left-facing camera on the left side of the mast and supported by a first vertical scanning actuator; and right-facing camera on the right side of the mast and supported by a second vertical scanning actuator. The robotic system can also include a zoom lens, a wide-angle lens, or any other type of lens on each camera.

However, the robotic system can define any other form and can include any other sensor and actuators supporting autonomous navigating and data capture throughout a store environment.

4. Robotic System Dispatch

Block S102 of the method S100 recites, at the robotic system, autonomously navigating toward an area of a floor of the store during a scan cycle. Generally, in Block S102, the autonomous vehicle can autonomously navigate throughout the store, such as: during an inventory tracking routine in which the robotic system's primary function is to record images of inventory structures for product tracking and derivation of the current stock state of the store; or during a spill detection routine in which the robotic system's primary function is to scan the store for fluid spills and other hazards.

4.1 Inventory Tracking Routine

Figure 4:
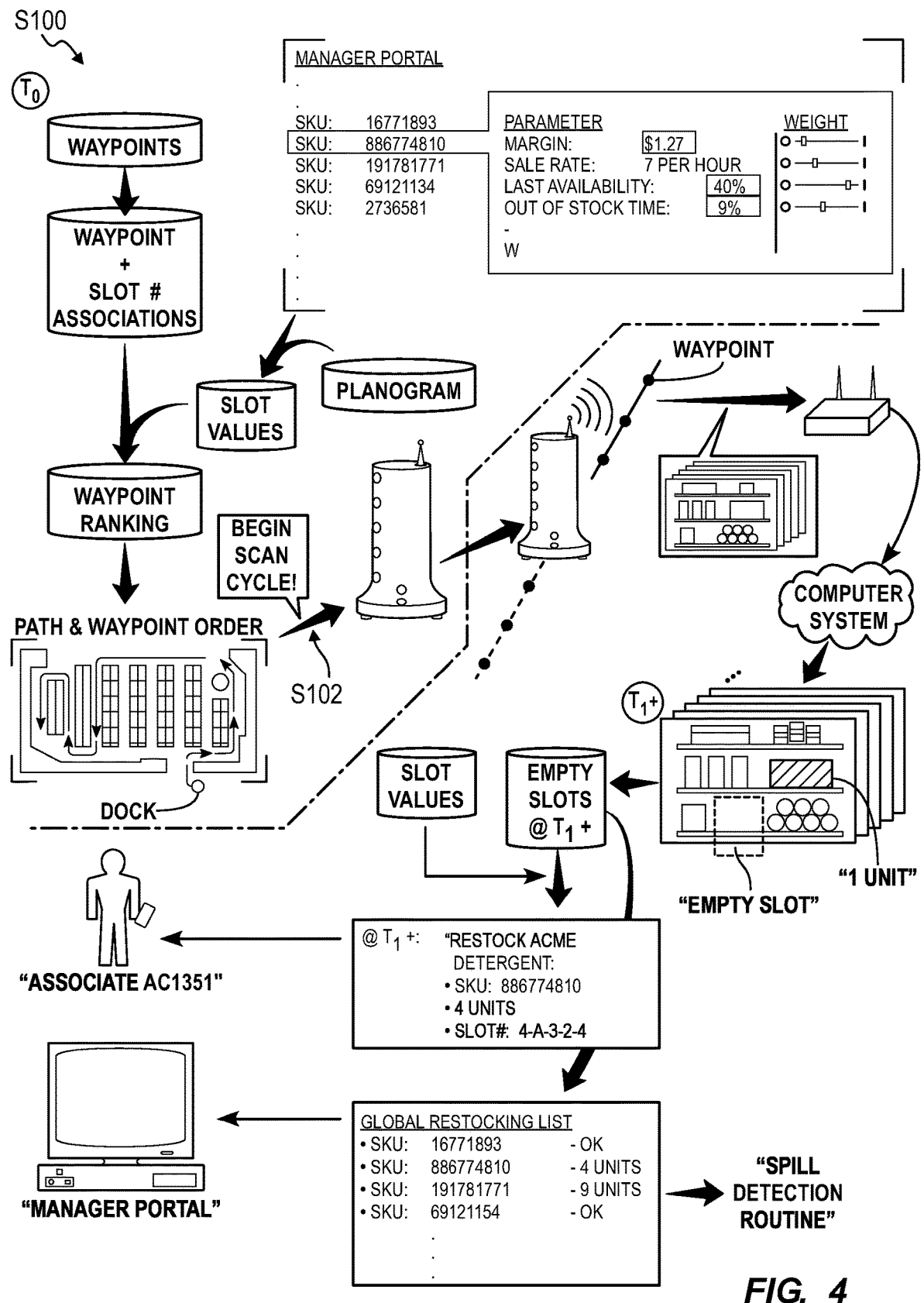
FIG. 4 is a flowchart representation of one variation of the method.

In one implementation, the robotic system executes Blocks of the method S100 while executing an inventory tracking routine within the store. In this implementation and as shown in FIG. 4, the remote computer system (e.g., a remote server connected to the robotic system via the Internet): defines a set of waypoints specifying target locations within the store at which the robotic system is to navigate and capture images of inventory structure throughout the store; and intermittently (e.g., twice per day) dispatches the robotic system to navigate through this sequence of waypoints and to record images of inventory structures nearby during an inventory tracking routine. For example, the robotic system can be installed within a retail store (or a warehouse, etc.), and the remote computer system can dispatch the robotic system to execute an inventory tracking routine during store hours, including navigating to each waypoint throughout the retail store and collecting data representative of the stock state of the store in real-time as patrons move, remove, and occasionally return product on, from, and to inventory structures throughout the store. Alternatively, the remote computer system can dispatch the robotic system to execute this inventory tracking routine outside of store hours, such as every night beginning at 1 AM. The robotic system can thus complete an inventory tracking routine before the retail store opens hours later.

In a similar implementation, the remote computer system: dispatches the robotic system to navigate along aisles within the store (e.g., through the sequence of predefined waypoints within the store) and to capture images of products arranged on inventory structures (e.g., shelving structures, refrigeration units, displays, hanging racks, cubbies, etc.) throughout the store during an inventory tracking routine; downloads color images of these inventory structures recorded by the robotic system; and implements image processing, computer vision, artificial intelligence, deep learning, and/or other methods and techniques to estimate the current stocking status of these inventory structures based on products detected in these images. The robotic system can additionally or alternatively broadest radio frequency queries and record radio frequency identification (or "RFID") data from RFID tags arranged on or integrated into products stocked throughout the store during the inventory tracking routine; and the remote computer system can download these RFID data from the robotic system and detect locations and quantities of products throughout the store based on these data. The remote computer system can then automatically generate a stocking report for the store, such as including slots or other product locations that are sufficiently stocked, understocked, incorrectly stocked, and/or disheveled as described in U.S. patent application Ser. No. 15/347,689.

The remote computer system can therefore maintain, update, and distribute a set of waypoints to the robotic system, wherein each waypoint defines a location within a store at which the robotic system is to capture one or more images from the integrated thermographic, depth, and/or color cameras. In one implementation, the remote computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of)

a (x,y) coordinate of the store as defined in the waypoint. For example, for a store that includes shelving structures with four-foot-wide shelving segments and six-foot-wide aisles, the remote computer system can define one waypoint laterally and longitudinally centered—in a corresponding aisle—between each opposite shelving segment pair. A waypoint can also define a target orientation, such as in the form of a target angle ("$\ominus$") relative to the origin of the store, based on an angular position of an aisle or shelving structure in the coordinate system, as shown in FIG. 5. When executing a waypoint, the robotic system can orient to (e.g., within 1.5° of) the target orientation defined in the waypoint in order to align a camera to an adjacent shelving structure.

When navigating to a waypoint, the robotic system can scan an environment nearby with the depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,$\ominus$) location and target orientation defined in the waypoint. A waypoint can also include a geospatial position (e.g., a GPS location), such as in the form of a backup or redundant location. For example, when navigating to a waypoint, the robotic system can approach the geospatial position defined in the waypoint; once within a threshold distance (e.g., five feet) from the geospatial position, the remote computer system can navigate to a position and orientation at which the output of the depth sensor aligns—within a threshold distance and angle—with a region of the master map corresponding to the (x,y,$\ominus$) location and target orientation defined in the waypoint.

Furthermore, a waypoint can include an address of each camera that is to capture an image once the robotic system can navigate to the waypoint. For example, for the robotic system that includes a thermographic camera, a depth camera, and a color camera, the waypoint can include all or a subset of camera addresses [1, 2, 3] corresponding to a thermographic camera, a depth camera, and a color camera, respectively. Alternatively, for the robotic system that includes articulable cameras, a waypoint can define an address and arcuate position of each camera that is to capture an image at the waypoint.

In one implementation, before initiating a new inventory tracking routine, the robotic system can download—from the remote computer system—a set of waypoints, a preferred order for the waypoints, and a master map of the store defining the coordinate system of the store. Once the robotic system leaves its dock at the beginning of an inventory tracking routine, the robotic system can repeatedly sample its integrated depth sensors (e.g., a LIDAR sensor) and construct a new map of its environment based on data collected by the depth sensors. By comparing the new map to the master map, the robotic system can track its location within the store throughout the inventory tracking routine. Furthermore, to navigate to a next waypoint, the robotic system can confirm its achievement of the waypoint—within a threshold distance and angular offset—based on alignment between a region of the master map corresponding to the (x,y,$\ominus$) location and target orientation defined in the current waypoint and a current output of the depth sensors, as described above.

Alternatively, the robotic system can execute a waypoint defining a GPS location and compass heading and can confirm achievement of the waypoint based on outputs of a GPS sensor and compass sensor within the robotic system. However, the robotic system can implement any other methods or techniques to navigate to a position and orientation within the store within a threshold distance and angular offset from a location and target orientation defined in a waypoint.

Yet alternatively, during an inventory tracking routine, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during an inventory tracking routine to maximize a value of inventory structures or particular products imaged by the robotic system per unit time responsive to dynamic obstacles within the store (e.g., patrons, spills), such as described in U.S. patent application Ser. No. 15/347,689.

Therefore in this implementation, the robotic system can autonomously navigate along a set of aisles within the store during an inventory tracking routine. While autonomously navigating along a particular aisle in this set of aisles in the store, the robotic system can: record a set of color images of a set of shelving structures facing the particular aisle; record a thermal image of the particular aisle at a first time; record a depth map of the particular aisle at approximately the first time; and then process this thermal image and the depth map to predict a spill in the particular aisle while continuing to record color images of the inventory structures facing the particular aisle. In response to detecting a spill in the particular aisle, the robotic system can then serve a prompt—indicating a spill in the particular aisle in the store—to a computing device affiliated with the store or with a particular associate of the store. The robotic system can also upload these color images of inventory structures in the particular aisle to the remote computer system for remote processing, such as in real-time or upon conclusion of the inventory tracking routine. The remote computer system can: detect a first shelf in a first shelving structure in a first region of a first color image, in the set of color images, recorded at approximately the first time; identify an address of the first shelf; retrieve a first list of products assigned to the first shelf by a planogram of the store based on the address of the first shelf; retrieve a first set of template images from a database of template images, wherein each template image in the first set of template images depicts visual features of a product in the first list of products; extract a first set of features from the first region of the first color image; and determine that a unit of the first product is improperly stocked on the first shelf in response to deviation between features in the first set of features and features in the first template image. Then, in response to determining that the unit of the first product is improperly stocked on the first shelf, the remote computer system can generate a restocking prompt for the first product on the first shelf and serve this restocking prompt to an associate of the store in real-time or append the restocking prompt to a current restocking list for the store, which the remote computer system later serves the associate of the store upon conclusion of the inventory tracking routine, such as described in U.S. patent application Ser. No. 15/600,527. In this implementation, the robotic system can repeat the foregoing process to record color images along each inventory structure and check for spills in each aisle in the store during the inventory tracking routine; and the remote computer system can repeat the foregoing processes to derive a current stocking state of the store from these color images recorded by the robotic system during this inventory tracking routine.

4.2 Dedicated Spill Detection Routine

Additionally or alternatively, the robotic system can autonomously navigate throughout the store and execute Blocks of the method S100 to detect spills during dedicated spill detection routines. For example, when not executing inventory tracking routines and recharging at a dock located in the store and/or during high traffic periods in the store, the robotic system can autonomously execute a dedicated spill detection routine, including: navigating along aisles throughout the store with priority to aisles stocked with liquid products; and executing Blocks of the method S100 to record thermal, depth, and/or color images of floor spaces along these aisles and fusing these thermal, depth, and/or color images to detect spilled fluids and other obstacles in these aisles.

In one implementation, the remote computer system can: access a planogram of the store; scan the planogram to identify a first set of aisles—in a set of aisles within the store—assigned at least one product known to contain a liquid (e.g., bottled beverages, olive oil, tomato sauce); and scan the planogram to identify a second set of aisles—in the set of aisles within the store—assigned dry goods and excluding products containing liquids by the planogram of the store. The remote computer system can then assign a high priority to scanning the first set of aisles for fluid spills and a lower priority to scanning the second set of aisles for fluid spills. During a next spill detection routine, the robotic system can: autonomously navigate along the first set of aisles within the store and scan these high-priority aisles for fluid spills at a first frequency; and autonomously navigate along the second set of aisles within the store and scan these lower-priority aisles for fluid spills at a second frequency less than the first frequency.

In the foregoing implementation, the remote computer system can define spill detection priorities with greater resolution for aisles throughout the store. For example, the remote computer system can assign: a highest priority to an aisle containing cooking oils; a next-highest priority to an aisle containing beverages in glass bottles; a next-highest priority to an aisle containing fresh eggs; a next-highest priority to an aisle containing canned goods containing liquid (e.g., tomato sauce, beans in water or oil); a next-highest priority to an aisle facing a refrigeration unit or freezer (which may leak condensed water into the aisle); a next-highest priority to an aisle stocked with small dry goods (e.g., rice, pasta); . . . ; and a lowest priority to an aisle containing large dry goods only (e.g., bah tissue). The remote computer system can also rank aisles by proximity to high-priority aisles.

The remote computer system can implement similar methods and techniques to rank small discrete aisle segments (e.g., one-meter long aisle segments) based on: spill and slip risk for products stocked in adjacent inventory structures (e.g., high spill and slip risk for oils contained in glass bottles; moderate spill and slip risk for dry bagged rice and eggs; and low spill and slip risk for packaged bath tissue); and proximity to other aisle segments facing high spill and slip risk products. For example, the computer system can: segment the store into discrete aisle segments. For each aisle segment, the remote computer system can: identify and estimate distances from the aisle segment to each product in the store based on product locations specified in the planogram of the store; calculate the quantitative product of this distance and spill and slip risk score for each product in the store; and calculate a sum of these quantitative products for the aisle segment; and store this sum as a spill detection priority for the aisle segment. The remote computer system can: repeat this process for each aisle segment defined within the store; and then calculate a continuous path throughout the store that, when executed by the robotic system, locates the robotic system in or near each aisle segment at a frequency approximately proportional to spill detection priorities thus derived for these aisle segments. During dedicated spill detection routines, the robotic system can thus navigate along the continuous path, such as by default.

Additionally or alternatively, during a dedicated spill detection routine, the robotic system can dynamically define a route through the store that: avoids areas with high patron traffic; avoids collision with patrons; and/or intersects aisles segments with highest spill detection priorities with greatest frequency.

In a similar implementation, the remote computer system can rank aisles (or discrete aisle locations) within the store based on historical spill event data for the store, such as collected by the robotic system during previous spill detection routines or previously input by store associates during past maintenance of the store. For example, the remote computer system can: access a history of fluid spill events previously detected by the robotic system while executing spill detection routines and/or inventory tracking routines in the store; and generate a heatmap of fluid spill events based on this history. In this example, the remote computer system can compile these fluid spill events into a heatmap depicting spill intensities as a function of: fluid spill event frequency (e.g., for all time or with recent spill events weighted over older spill events); liquid risk score (e.g., high risk for cooking oils, low risk for pasta sauce); and/or spill size. The remote computer system can then calculate a continuous path throughout the store that, when executed by the robotic system, locates the robotic system in or near aisles or aisle segments at a frequency approximately proportional to corresponding spill intensities. The robotic system can then autonomously navigate along this path during a subsequent spill detection routine.

Similarly, the remote computer system can: identify a first aisle—in a set of aisles in the store—associated with a first quantity of historical fluid spill events over a period of time; and identify a second aisle—in the set of aisles in the store—associated with a second quantity of historical fluid spill events, less than the first quantity of historical fluid spill events, over the same period of time. During a subsequent spill detection routine, the robotic system can then: autonomously navigate along the first aisle at a first frequency; and autonomously navigate along the second aisle at a second frequency, less than the first frequency, according to such rank or priority derived from historical spill event data of the store.

The remote computer system can also derive a route through the store or aisle or aisle segment priority based on both: spill and slip risks of liquid products stocked nearby; and historical fluid spill event data for the store. Furthermore, the remote computer system can implement similar methods and techniques to derive a route through the store or aisle or aisle segment priority for other types of liquid and non-liquid products (e.g., rice, bath tissue) stocked in the store.

However, the robotic system and/or the remote computer system can implement any other method or technique to define a route through the store based on types of products in the store, spill and slip risk for these products, locations of these products, etc.

Furthermore, the robotic system can execute spill detection routines separately from inventory tracking routines in the store. Alternately, the computer system can execute consecutive inventory tracking and spill detection routines. For example, the robotic system can navigate off of its dock and initiate an inventory tracking routine at a scheduled time. Upon completing the inventory tracking routine, the robotic system can transition to executing a spill detection routine until a charge state of the robotic system drops below a low threshold, at which time the robotic system can navigate back to its dock to recharge before a next scheduled inventory tracking routine.

5. Thermal Image and Gradient Detection

Block S110 of the method S100 recites recording a thermal image of an area of a floor of the store; and Block S112 of the method S100 recites detecting a thermal gradient in the thermal image. Generally, in Block S110, the robotic system records thermal images via the thermographic camera (or infrared or other thermal sensor) integrated into the robotic system throughout operation (e.g., during an inventory tracking routine or spill detection routine). In Block S112, the robotic system (or the remote computer system) processes these thermal images to identify thermal gradients (i.e., temperature disparities, temperature discontinuities) in regions of these thermal images that intersect a floor surface or ground plane depicted in these thermal images, such as shown in FIG. 2. The robotic system (or the remote computer system) can then interpret such thermal gradients as either solid objects (boxes, cans, bottles, grapes, apples) or amorphous objects (e.g., fluids, liquids) based on additional color and/or height data collected through the color camera(s) and depth sensor(s) integrated into the robotic system, as described above.

In one implementation, the robotic system regularly records thermal images, such as at a rate of 2 Hz, via a forward-facing thermographic camera throughout operation in Block S110. Concurrently, the robotic system can record a depth map through the depth sensor (e.g., at a rate of 10 Hz) and/or record a color image through the color camera (e.g., at a rate of 20 Hz). As the robotic system records thermal images, the robotic system can locally scan a thermal image for a thermal gradient, temperature disparity, reflectivity disparity, or emissivity disparity, etc. —proximal a ground plane (i.e., the floor) depicted in the thermal image—which may indicate presence of two different materials in the field of view of the thermographic camera (e.g., a floor material and a liquid). Generally, when a substance (e.g., oil, water, soda, tomato sauce, or other liquid; grains, grapes, pasta, or another non-liquid substance) has spilled onto a surface of the floor of the store, this substance may present as a temperature disparity (or temperature discontinuity, thermal gradient)—relative to a background floor material—in a thermal image of this surface of the floor, such as due to differences in properties (e.g., heat capacity, thermal reflectivity, thermal emissivity) between the substance and the floor material and/or due to differences in temperatures of the substance and the floor material (e.g., a spilled fluid that is cooler than the adjacent floor material due to evaporation of the spilled fluid).

Throughout operation, the robotic system can: access a 2D or 3D localization map of the store, including representations of a floor space and immutable objects (e.g., shelving structures, store infrastructure, aisle delineations, etc.) throughout the store; implement localization techniques to determine its location and orientation within the store based on the depth map and/or the color image and the 2D or 3D map of the store; and autonomously navigate between waypoints or along a planned route within the store based on its derived location.

Furthermore, based on the location and orientation of the robotic system in the store, a known position of the thermographic camera on the robotic system, and the localization map, the robotic system can: predict a floor area of the store in the field of view of the thermographic camera at the time the thermal image was recorded; generate a thermal image mask that represents this floor area (and excludes footprints of fixed inventory structure and other fixed infrastructure at known locations in the store, as depicted in the localization map); and project this thermal image mask onto the thermal image. By thus overlaying the thermal image mask onto the thermal image, the robotic system can define an area of the floor depicted in the thermal image (hereinafter a "region of interest" in the thermal image). In particular, the remote computer system can leverage existing store data to isolate a region(s) of the thermal image corresponding to the floor of the store based on the location and orientation of the robotic system and the position and properties of the thermographic camera on the robotic system.

Additionally or alternatively, the robotic system can implement computer vision, deep learning, machine learning, and/or other perception techniques to: detect inventory structures and other objects in the depth map and/or the concurrent color image; derive bounds of the floor depicted in the depth map and/or the concurrent color image; project the bounds of the floor onto the thermal image based on the known position of the thermographic camera on the robotic system; and thus isolate a region of interest in the thermal image that depicts the floor surface. However, the robotic system can implement any other method or technique to isolate a segment of the thermal image that excludes inventory structures and other fixed infrastructure, etc. in the store.

The remote computer system can then scan the region of interest in the thermal image for a thermal gradient, which may indicate presence of an obstacle (e.g., a solid object or liquid) characterized by a different temperature, reflectivity, and/or thermal emissivity than the adjacent floor surface. In one implementation, the remote computer system implements edge detection, blob detection, and/or other computer vision techniques to delineate a thermal gradient(s) in the region of interest in the thermal image. In another implementation, the remote computer system: calculates a nominal floor temperature by averaging temperatures of pixels throughout the region of interest of the thermal image; generates a normalized thermal image by subtracting the nominal floor temp from each pixel in the region of interest of the thermal image; identifies a subset of pixels in the normalized thermal image that differ from a "0" value by more than a threshold difference; and flags clusters of pixels—in this subset of pixels—that exceed a minimum size (e.g., a ten-millimeter-wide by ten millimeter-long area in real space).

Therefore, the robotic system can: project a floor boundary (e.g., excluding known footprints of inventory structures) onto a thermal image; detect a region in the thermal image that intersects the floor of the store and contains a temperature discontinuity (or temperature, or thermal gradient); and then flag an area of the floor of the store depicted in this region of the thermal image as possibly containing a hazard, such as spilled fluid or other object.

However, the remote computer system can implement any other method or techniques to identify a discontinuity, disparity, or other thermal gradient in the thermal image and to flag this discontinuity as a possible location of a hazard on the floor of the store. Additionally or alternatively, the robotic system can upload these thermal images to the remote computer system—such as over a cellular network or local area network—and the remote computer system can implement similar methods and techniques to remotely process these thermography data.

5.1 Dynamic Thermal Gradient

In one variation, the thermographic camera exhibits a resolution sufficiently high to detect areas of a floor space heated (or cooled) by patrons' feet when walking through the store. For example, when a patron steps from a hot asphalt parking lot into the air-conditioned store, hot soles of the patron's shoes may transfer heat into the store floor to form momentary thermal "footprints" along the patron's path; these thermal footprints may be detectable by the thermographic camera and may be depicted within a thermal image as thermal gradients along the patron's path through the store. However, over time (e.g., within seconds) heat transferred from the patron's shoes into the floor of the store may dissipate such that these thermal footprints fade over this period of time. Therefore, to distinguish possible solid and amorphous objects on the floor of the store from such thermal footprints, the remote computer system can: track thermal gradients over a sequence of thermal images; discard thermal gradients that dissipate relatively quickly as likely to depict thermal footprints; and interpret persistent thermal gradients as possible solid and/or amorphous objects over the floor surface.

In this implementation, the robotic system can regularly record and process thermal images during operation, as described above. Upon detecting a thermal gradient in a first thermal image, the robotic system can implement object tracking or other techniques to detect the same or similar thermal gradient in subsequent thermal images. Thus, if the thermal gradient detected in the first thermal image diminishes in size and/or peak temperature difference from a nominal floor temperature over subsequent thermal images (and therefore over time), the robotic system can label the thermal gradient as a thermal footprint and discard the thermal gradient accordingly. However, if the thermal gradient detected in the first thermal image remains substantially consistent in size, remains substantially consistent in peak temperature difference from a nominal floor temperature, and/or increases in size over subsequent thermal images (and therefore over time), the robotic system can label the thermal gradient as likely to represent a solid or amorphous object on the floor space of the store.

Similarly, after recording a first thermal image of the area of the floor of the store, the robotic system can: record a subsequent sequence of thermal images depicting the same or similar area of the floor of the store; scan this sequence of thermal images for thermal gradients within the area of the floor of the store; and characterize a spatial rate of change of these thermal gradients—within the area of the floor of the store—detected in this sequence of thermal images. The robotic system can then predict presence of a fluid (or other hazard) within the area of the floor: in response to detecting a thermal gradient in the first thermal image; if the spatial rate of change of thermal gradients detected in the sequence of thermal images falling below a threshold rate of change; and in response to detecting absence of a height gradient in a corresponding location in the concurrent depth map, as described below. However, in this example, the robotic system can identify a thermal gradient—detected in the thermal image—as depicting other than fluid in the corresponding area of the floor of the store if the spatial rate of change of thermal gradients detected in the sequence of thermal images exceeds a threshold rate of change and is trending toward an average temperature of the area of interest (e.g., the floor area) in the thermal image.

However, the remote computer system can implement any other methods or techniques to track thermal gradients over sequences of thermal images and to characterize these thermal gradients as of interest (e.g., possibly a solid or amorphous object on the floor) or not of interest (e.g., a thermal footprint).

5.2 Thermal Image Stitching

The robotic system can execute this process for each discreet thermal image thus recorded during operation. Alternatively, the robotic system can stitch this sequence of thermal images recorded during the inventory tracking routine into a composite thermal image of the floor of the store and execute the foregoing process to detect thermal disparities or thermal gradients throughout the store.

For example, a patron may inadvertently spill water or drop and break a beer bottle while walking down an aisle in the store. In this example, upon reaching and navigating down this aisle during the inventory tracking routine, the robotic system can: record thermal images along the aisle; stitch these thermal images into a composite thermal image depicting the floor along the aisle; project a footprint of shelving structures along the aisle onto the composite thermal image in order to crop the composite thermal image to the floor of the aisle exclusively; and scan this composite thermal image for a temperature gradient exhibiting more than a threshold temperature difference per unit distance (e.g., more than a 1° C. temperature difference over a distance of less than ten centimeters). Due to evaporative cooling of water and water-based liquids, the spilled fluid may present in the composite thermal image at a lower temperature than the surrounding floor surface within the aisle. The robotic system can therefore delineate (or approximate) a region of the thermal image corresponding to this spilled fluid based on this temperature disparity and the threshold temperature difference and isolate a particular location of this spilled fluid in the store based on the location of this temperature disparity in the composite thermal image.

6. Depth Map

Block S120 of the method S100 recites: recording a depth map of the area of the floor; and Block S122 of the method S100 recites scanning a region of the depth map, corresponding to the thermal gradient detected in the thermal image, for a height gradient. Generally, in Block S120, the robotic system can record depth images via the depth sensor on the robotic system; in Block S122, the robotic system can fuse these depth data with cospatial thermography data collected in Block S110 to predict whether a temperature discontinuity (or temperature disparity or thermal gradient) detected in the thermal image represents a fluid (e.g., a liquid film) or another solid object (e.g., a box, a can, a grape) on the floor of the store. In particular, when spilled on a flat surface such as a floor, fluids (e.g., liquids, such as oil, water) may distribute substantially evenly across this surface and may therefore be substantially indistinguishable from a ground plane depicted in a depth map recorded by the robotic system. However, boxes, cans, grapes, and other solid objects may extend substantively above the ground plane in the depth image and may therefore be discernable within the depth map. Therefore, by combining depth and temperature data, the robotic system can differentiate between amorphous substances (e.g., fluids liquids) that have distributed across the floor surface and solid objects present on top of the floor surface.

Throughout operation, the robotic system can regularly record a depth map (e.g., LIDAR) by sampling the depth sensor, such as at a rate of 10 Hz. Based on the depth map, the robotic system can determine its location (i.e., "localize itself") within the store, such as described above. The robotic system can then: access a known location and orientation of the thermographic camera and a location and orientation of the depth sensor; access a lookup table and/or a parameterized model for projecting pixels of the depth map onto the thermal image; link or map each pixel within the region of interest of the thermal image to a corresponding pixel in the depth map according to the parameterized model and/or lookup table; and identify a region of the depth map that corresponds to the region of interest in the thermal image. The robotic system can also: project a floor plan of the store onto the depth map to isolate a segment of the depth map representing the floor of the store and excluding a fixed display near the area of the floor in the store; project a ground plane onto the segment of the depth map; and then scan the segment of the depth map for an object offset above the ground plane.

In particular, after isolating the region of the depth map that corresponds to the region of interest in the thermal image, the robotic system can scan the region of the depth map for a height gradient, which may indicate presence of a solid object on the area of the floor adjacent the robotic system. In one implementation, the robotic system can execute edge detection, blob detection, and/or other computer vision techniques to delineate a height gradient(s) in the region of the depth map. In another implementation, the robotic system can: identify lowest points within the region of the depth map; estimate a plane that intersects each of these lowest points; identify the plane as a ground plane (or floor) within the depth map; and remove pixels at or below the ground plane. The robotic system can then scan the remaining portion of the region of the depth map for objects exhibiting upper surfaces offset above the ground plane. In a similar implementation, the robotic system can access a floor map identifying the ground plane and immutable objects within the store; project a location and orientation of the robotic system at a time the depth map was recorded and a known field of view of the depth sensor onto the map of the store to define a mask representing a floor area within the field of view of the depth sensor. The robotic system can then overlay the mask onto the region of the depth map to calculate an area of interest within the region of the depth map offset above the floor. In response to detecting height gradients and/or surfaces within this area of interest within the depth map, the robotic system can identify presence of a solid object (e.g., a box or a grape) offset above the ground floor.

In a similar implementation, the robotic system: generates a three-dimensional (or "3D") depth map based on data recorded by the depth sensor during the inventory tracking routine; aligns a current thermal image to the depth map based on known positions of the thermal image and the depth sensor on the robotic system; projects a location of a temperature disparity detected in the thermal image onto the depth map based on alignment of the thermal image to the depth map; and then scans a region of the depth map around the projector temperature disparity for a height disparity (or a height gradient, an object greater than a minimum height above a ground plane projected onto the depth map). If the robotic system fails to detect such a height disparity, the robotic system can interpret the temperature disparity as representing a liquid. Similarly, if the robotic system fails to detect a height disparity greater than a minimum height offset (e.g., one centimeter) in this region of the depth map and the temperature disparity spans a dimension—in the horizontal plane—that exceeds a minimum length (e.g., four centimeters), the robotic system can interpret the temperature disparity as representing a liquid and flag this liquid for immediate cleanup. However, if the robotic system fails to detect a height disparity greater than a minimum height offset (e.g., one centimeter) in this region of the depth map but the temperature disparity spans a dimension—in the horizontal plane—less than the minimum length, the robotic system can interpret the temperature disparity as representing a small hazardous object (e.g., a grape) and flag this object for immediate cleanup. Similarly, if the robotic system detects a height disparity between the minimum height offset and a maximum height offset (e.g., fifteen centimeters) in this region of the depth map, the robotic system can interpret the height disparity as a medium-sized hazardous object (e.g., a can, a bottle, a banana peel) and flag this object for cleanup within five minutes. Furthermore, if the robotic system detects a height disparity greater than the maximum height offset in this region of the depth map, the robotic system can interpret the height disparity as a large hazardous object and flag this object for cleanup within thirty minutes.

However, the robotic system can implement any other methods or techniques to identify a disparity in height in the depth map, to correlate this height disparity with a cospatial thermal disparity in the concurrent thermal image, and to flag this disparity as a location of a possible hazard (e.g., a fluid, a solid object) on the floor of the store.

7. Color Image

Block S130 of the method S100 recites recording a color image of the area of the floor; and Block S132 of the method S100 recites scanning a region of the color image, corresponding to the thermal gradient in the thermal image, for a color gradient. Generally, the robotic system records color images or other photographic data of a field near (e.g., ahead of) the robotic system via an integrated color camera in Block S130 and then processes the color camera to detect an object cospatial with a thermal disparity and/or a height disparity detected in concurrent thermal and depth images in Block S132.

Throughout operation, the robotic system can regularly record a color image by sampling the color camera, such as at a rate of 20 Hz. Upon detecting a thermal disparity in a concurrent thermal image, the robotic system can: project a boundary around the thermal disparity in the concurrent thermal image onto the color image based on positions of the thermographic camera and the color camera on the robotic system to define a region of interest in the color image; and then scan this region of interest for a color gradient (or color discontinuity, color disparity, color change, color shift) in this region of interest in Block S132.

In particular, after isolating this region of interest of the color image—which corresponds to the region of interest in the thermal image—the robotic system can scan the region of the color image for a color gradient, which may indicate presence of a colored substance or object on the area of the floor adjacent the robotic system. In one implementation, the robotic system executes edge detection, blob detection, and/or other computer vision techniques to delineate a color gradient in this region of interest in the color image. For example, if an object depicted in a thermal image is other than a clear liquid, the region of interest in the concurrent color image may exhibit a color gradient. The robotic system can therefore scan the region of interest in the color image for a color gradient. Upon detecting a color gradient in the region of interest, the robotic system can: verify presence of an object in the corresponding location on the floor of the store; flag this location as occupied by a hazard; and note this hazard as a colored (e.g., humanly-visible) object. However, if the robotic system fails to detect a color gradient in or around the region of interest, the robotic system can predict that the thermal gradient depicted in the thermal image and a lack of a height gradient in a corresponding region of the concurrent depth map correspond to a clear (or substantially translucent) fluid, such as water or oil.

However, the robotic system can implement any other methods or techniques to identify a color gradient (or color discontinuity, color disparity, color shift) in the color image and to flag this color gradient as a location of a possible hazard (e.g., a colored liquid) on the floor of the store.

8. Object Detection and Characterization

Block S150 of the method S100 recites, in response to detecting the thermal gradient in the thermal image and in response to detecting absence of a height gradient in the region of the depth map, predicting presence of a fluid within the area of the floor. Generally, in Block S150, the robotic system (or the remote computer system) can fuse thermal, depth, and color image data—recorded concurrently by the thermographic camera, depth sensor, and color image camera on the robotic system—to confirm presence of the substance on the floor and/or to derive additional characteristics of this substance, such as type, visibility, priority, and/or cleaning methods. In particular, the robotic system can implement computer vision techniques to identify characteristics of the object within each of the thermal, depth, color, and/or composite images and classify the object in order to facilitate removal of the object from the floor of the store, as shown in FIG. 1.

8.1 Fluid Spill

In one implementation, in response to detecting presence of a thermal gradient in a thermal image in Block S112, absence of a height gradient in a cospatial region of a concurrent depth map in Block S122, and presence of a color gradient in a cospatial region of a concurrent color image in Block S132, the robotic system can identify an object in these cospatial regions of the thermal, depth, and color images as a colored liquid film, such as spilled soda or tomato sauce. Similarly, in response to detecting presence of a thermal gradient in a thermal image in Block S112, absence of a height gradient in a cospatial region of a concurrent depth map in Block S122, and absence of a color gradient in a cospatial region of a concurrent color image in Block S132, the robotic system can identify an object in these cospatial regions of the thermal, depth, and color images as a clear or substantially translucent liquid film, such as spilled water or oil.

In one example, the robotic system: records a thermal image of a floor area in Block S110; records a depth map spanning the floor area in Block S120; records a color image of the floor area in Block S130; detects a thermal gradient in the thermal image in Block S112; detects lack of a height gradient cospatial with the thermal gradient in the depth map in Block S122; and scans a region of the color image—cospatial with the thermal gradient detected in the thermal image—for a color gradient in Block S132. In Block S150, the robotic system can then identify presence of clear fluid in the floor area in response to: detecting the thermal gradient in the thermal image; detecting absence of the height gradient (e.g., absence of a surface offset above a ground plane—projected onto or defined in the depth map—by more than a minimum height threshold of one centimeter) in the cospatial region of the depth map; and detecting absence of a color gradient in the cospatial region of the depth map. In Block S160 described below, the robotic system can then serve a prompt—to a computing device affiliated with the store or with a particular store associate—specifying removal of the fluid from the area of the floor of the store and identifying the fluid as clear.

For example, a spilled liquid (e.g., water, oil) may distribute across a floor surface nearly within the plane of the floor. Due to the liquid's transparency and flat dispersion of the water across the floor, the robotic system can: detect a thermal gradient distributed across this region of the floor in the thermal image; detect absence of a cospatial height gradient in the depth map; and detect absence of color in the corresponding color image. Accordingly, the robotic system can identify a substance depicted in the thermal image as a clear or translucent amorphous liquid in Block S150 and can serve a prompt—labeled as "urgent"—to clear this substance with a mop to a store associate in Block S160. However, if the robotic system detects presence of a color gradient (e.g., a brown "blob") in the corresponding region of the color image, the robotic system can identify the substance depicted in the thermal image as a colored amorphous liquid. The robotic system can also predict a type of this liquid based on a color detected in this region of the color image, such as: soda if light brown (and near a beverage aisle); a sports drink if blue (e.g., near a beverage aisle); soy sauce if dark brown (and near a condiment aisle); tomato sauce if red (and near a canned food aisle); etc.

Alternatively, the robotic system can implement an object classifier and/or other deep learning, computer vision, or perception techniques to predict presence of a spilled fluid in the floor area. For example, in response to detecting a thermal gradient in a thermal image and in response to detecting absence of a height gradient in a cospatial region of a concurrent depth map, the robotic system can: extract a profile (e.g., a 2D profile or boundary) of the thermal gradient from the thermal image; pass this profile of the thermal gradient into a fluid spill classifier to calculate a confidence score for presence of a fluid within the floor area; and then predict presence of a fluid within the floor area if this confidence score exceeds a threshold value (e.g., 40%). For example, if the profile of the thermal gradient is linear (e.g., includes linear edges), the fluid spill classifier can output a low confidence score for presence of fluid and a high confidence score for presence of a flat sheet of paper, a flat label, or flat packaging material in the floor area. The robotic system can then verify presence of this paper material based on a color gradient (e.g., texture gradient, color shift, reflectivity shift) in a cospatial region of the concurrent color image in Block S150 and then output a prompt to clear this paper material from the floor area accordingly in Block S160. However, if the profile of the thermal gradient is nonlinear (e.g., amorphous), the fluid spill classifier can output a high confidence score for presence of fluid and a low confidence score for presence of a sheet of paper, a label, or packaging in the floor area. The robotic system can then characterize the detected fluid based on a color value or color gradient in the cospatial region of the concurrent color image in Block S150, as described above, and output a prompt to clear this fluid from the floor area accordingly in Block S160.

8.2 Small Hazardous Solid Object

Alternatively, in response to detecting a thermal gradient in the thermal image and detecting a cospatial height gradient in a depth map (e.g., presence of a surface offset above a ground plane—projected onto or defined in the depth map—by more than the minimum height threshold), the robotic system can predict presence of a solid object in the floor area.

For example, during operation, the robotic system can: autonomously navigate toward an area of the floor of the store in Block S102; record a thermal image of the area of the floor of the store in Block S110; record a depth map of the area of the floor in Block S120; detect a thermal gradient in the thermal image in Block S112; and scan a region of the depth map, corresponding to the thermal gradient detected in the thermal image, for a height gradient greater than a minimum height threshold in Block S122. In response to detecting a thermal gradient in the thermal image and in response to detecting a height gradient—greater than the minimum height threshold (e.g., one centimeter) and less than a maximum height threshold (e.g., fifteen centimeters)—in the corresponding region of the depth map, the robotic system can: predict presence of a small hazardous object (e.g., a grape, a can, a banana) within the floor area in Block S150; and then serve a prompt to remove the hazardous object from the floor area to a store associate in Block S160.

In one example, the robotic system can detect ovular objects within a region of the floor depicted in the thermal image, wherein each object presents as a thermal gradient distinct from the surrounding floor in the thermal image. The robotic system can scan the concurrent depth map to detect cospatial height gradients extending approximately two centimeters proud of the ground plane in the depth map (i.e., between the minimum and maximum height thresholds). The robotic system then implements template matching and/or other computer vision techniques to identify the ovular objects as grapes in Block S150 and prompts a store associate to clear these grapes from this floor area accordingly in Block S160.

8.3 Large Solid Object

However, the robotic system can identify objects extending above the ground plane in the depth map by more than the maximum height threshold as lower risk or non-risk obstacles. For example, in response to detecting presence of a static thermal gradient, presence of a static cospatial height gradient greater than the maximum height threshold, and presence of a static cospatial color gradient over a sequence of thermal, depth, and color images of a floor area, the robotic system can identify a box, pallet, or temporary display in this floor area. Accordingly, the robotic system can serve a low-priority prompt to a store associate to clear this box or pallet from this floor area accordingly. Alternatively, the robotic system can set a priority for clearing this box or pallet proportional to detected patron density nearby (e.g., in the same aisle of the store). In another example, in response to detecting presence of a transient thermal gradient, presence of a transient cospatial height gradient greater than the maximum height threshold, and presence of a transient cospatial color gradient over a sequence of thermal, depth, and color images of a floor area, the robotic system can identify a patron or shopping cart in this floor area in Block S150.

However, the robotic system can implement any other method or technique to detect low-risk or non-risk objects in the store in Block S150 and to respond (or not respond) accordingly in Block S160.

9. Cleanup Prompt

Block S160 of the method S100 recites serving a prompt to remove the fluid from the area of the floor of the store to a computing device affiliated with the store. Generally, following detection of a spill on the floor of the store, the robotic system (or the remote computer system) serves a notification to an associate of the store (e.g., an employee, an associate, or a custodian) to clear the spill.

In particular, the robotic system can broadcast or otherwise serve a prompt to a computing device (e.g., a mobile computing device, smartphone, a smart watch, and/or a laptop computer) affiliated with an associate of the store notifying the associate of the location of the spill in Block S160. Alternatively, the robotic system can serve a notification—indicating presence of the spill and including a prompt to dispatch a store associate to clear the spill—to a manager portal, such as rendered within a native application or a web browser executing on a computing device affiliated with the store manager. In this implementation, the robotic system can also serve to the manager portal a list of employees available to respond to the spill, near the spill, etc. In yet another implementation, the robotic system can broadcast a store-wide announcement (e.g., over an intercom or rendered on a display visible to store associates) globally indicating the location of the spill and other key characteristics of the spill, such as identified material, priority of response to the spill, a picture of the spill, number of patrons within the store, etc.

9.1 Spill Data

Furthermore, following identification of a substance on the floor of the store, the robotic system can prompt a store associate to address the spill. Based on characteristics of the object or substance identified in the thermal, depth, and/or color images, the robotic system can serve information about the substance on the floor—such as images of the spill, characteristics of the substance involved in the spill, suggested tools (e.g., mops, brooms, flour) for removal of the substance—to a store associate and prompt the associate to quickly remove the substance from the floor. In particular, the robotic system (or the remote computer system) can serve the information relevant to clearing the spill directly to the store associate, thereby: eliminating a need for the store associate to first investigate the spill before retrieving cleanup tools and materials and eventually cleaning the spill; and thus reducing a duration of time between detection of the spill and spill cleanup.

In one implementation, the robotic system populates a prompt to include information about the spill, such as a location of the spill within the store (e.g., "aisle 3"); a segment of a color image depicting the spill (which may enable the store associate to quickly identify tools needed to clear the spill); an approximate size of the spill (e.g., derived from an area, length, and/or width of the spill extracted from the thermal image); a priority level for cleanup of the spill; a countdown timer for clearing the spill; derived or predicted properties of the spilled substance (e.g., a predicted material type based on color and known fluid products stocked nearby); identifiers of nearby store associates available to clear the spill; and/or a number or density of patrons near the spill; etc.

For example, in response to detecting a spilled fluid at a particular location in the store, the robotic system (or the remote computer system) can: identify an aisle of the store proximal the spilled fluid based on a location of the robotic system and a stored planogram of the store; query the planogram for a list of products stocked in the aisle; and then estimate a probability that the spilled fluid is an oil based on this list of products. In particular, the robotic system can estimate a high probability that the spilled fluid is an oil if the list of products stocked in the aisle includes a packaged oil product (e.g., cooking oil, canned artichokes preserved in olive oil). The robotic system can also set a priority for cleanup of the spilled fluid: based on (e.g., proportional to) the estimated probability that the spilled fluid is oil; based on (e.g., inversely proportional to) opacity or human-visibility of the spilled fluid; based on (e.g., proportional to) patron density near the spilled fluid; etc. The robotic system can then: initialize an electronic notification; insert a prompt to remove the fluid from the particular location into the electronic notification; indicate the particular location of the spilled fluid (e.g., an aisle and adjacent shelving segment near the area of the floor of the store in which the spilled fluid was detected) in the electronic notification; insert a spill priority for removal of the fluid from the area of the floor into the electronic notification; initiate a timer—for cleanup of the spilled fluid—of a duration inversely proportional to the spill priority; and then transmit this electronic notification to a computing device affiliated with a store associate in Block S160.

9.2 Cleanup Tools

Furthermore, in the foregoing example, in response to estimating a high probability that the spilled fluid is an oil, the robotic system can insert—into the electronic notification—a recommendation for dry absorbent to remove the fluid and clear the spill. In response to estimating a low probability that the spilled fluid is an oil or oil-based and/or in response to estimating a high probability that the spilled fluid is water or water-based, the robotic system can insert—into the electronic notification—a recommendation for a mop to clear the spill. Alternatively, in response to estimating a high probability that the spilled substance is a dry powdered good or dry kernels (e.g., flour, sugar, rice, cereal), the robotic system can insert—into the electronic notification—a recommendation for a vacuum or broom to clear the spill.

In a similar example, in response to identifying a clear liquid (e.g., oil, water) on the floor of the store, the robotic system can prompt the associate to bring a mop and an absorptive material (e.g., clay litter, flour)—to absorb remaining oil on the floor after the associate mops up the majority of the spill. In another example, in response to identifying an opaque liquid (e.g., soda) on the floor, the robotic system can prompt the associate to bring a mop with a cleaning material (e.g., soap) to clear the soda spill to avoid a sticky residue on the floor after removal of the soda. In another example, based on thermal properties of the spill, the robotic system can identify a granular substance on the floor, such as rice or grains. In this example, the robotic system can prompt the associate to bring a broom and dustpan to collect the granular substance from the floor.

Therefore, based on characteristics of the spill extracted from the thermal depth, and/or color images, the robotic system can identify a set of tools appropriate for clearing the spill and serve a recommendation to the store associate to bring these tools to the location of a spill detected by the robotic system.

9.3 Prioritization of Responses

In one variation, the robotic system prioritizes urgency (or timing) of spill cleanup—such as based on spill size, spill material, and ultimately spill risk—and prompts an associate to respond to a spill accordingly.

For example, the robotic system can define a prioritization schedule for spill cleanup based on characteristics of the spill (e.g., size, material, ability to pass around the spill), patron density nearby, and/or the time of day during which the spill occurred. The robotic system can then serve notifications to store associates to respond to the spill according to the prioritization schedule (e.g., urgently, within the next hour, and/or prior to store reopening). Similarly, the robotic system can selectively prioritize cleanup of spills of certain substances over other substances. For example, the robotic system can prioritize removal of transparent substances, such as water and oil, over opaque or colored substances, such as soda or grapes, as patrons of the store may be unable to see the transparent substance and discern a boundary of the transparent substance.

In one implementation, the robotic system prioritizes prompting an associate to respond to large spills over smaller spills. In this implementation, the robotic system can estimate a size of an area of the floor covered by the spill by calculating a number of pixels representing the spill within the depth, thermal, and/or color images. The robotic system can then assign a priority level (e.g., "low", "medium", "high," or "urgent") to the spill based on the size of the spill area. For example, in response to the size of the spill area falling within a first range, the robotic system can assign a "low" priority level to the spill; in response to the size of the spill area falling within a second range larger than the first range, the robotic system can assign a "medium" priority level to the spill; and, in response to the size of the spill area falling within a third range larger than the second range, the robotic system can assign a "high" priority level to the spill.

In another implementation, the robotic system prioritizes prompting an associate to respond to spills of certain materials as "high risk." For example, in response to detecting a clear liquid (e.g., water) on the floor that patrons may not see, the robotic system can assign a high priority to this spill and prompt an associate to clear and/or otherwise demarcate a boundary of the clear liquid spill on the floor immediately following receipt of the prompt. Similarly, in response to detecting a translucent liquid with high viscosity (e.g., olive oil or squished grapes) and low coefficients of friction that patrons may slip on, the robotic system can assign a high priority to this spill and prompt an associate to clear and/or otherwise demarcate a boundary of the translucent liquid on the floor immediately following receipt of the prompt. In another example, in response to detecting an opaque liquid (e.g., soda) on the floor that most patrons may easily visually discern, the robotic system can assign a lower priority to this spill and prompt the associate to clear the liquid within a longer time limit (e.g., ten minutes).

For each priority level, the robotic system can assign a countdown timer (e.g., a time window) for clearing the spill to limit incidents caused by the spill. For example, for a "low" priority spill, the robotic system can assign a countdown timer of one hour to clear the spill from the floor; for a "medium" priority spill, the robotic system can assign a countdown timer of thirty minutes to clear the spill from the floor; and for a "high" priority spill, the robotic system can assign a countdown timer of five minutes to clear the spill from the floor. Then the robotic system can notify the associate and initiate a countdown timer for clearing the spill according to the priority level of the spill.

In a similar example, the robotic system can: scan a region of interest in a color image—cospatial with a thermal gradient detected in the concurrent thermal image and cospatial with absence of a height gradient in the concurrent depth map—for a color gradient in Block S132; estimate an opacity of the fluid based on the color gradient (e.g., proportional to a magnitude of color shift across a perimeter of the fluid detected in the floor area); calculate a priority for removal of the fluid from the area of the floor of the store inversely proportional to the opacity of the fluid; and prompt a store associate to clear this spill within a time limit proportional to this opacity.

In another implementation, the robotic system can assign a priority level to the spill based on a number of patrons nearby or who may approach the spill per unit time thereafter. In this implementation, the robotic system can prioritize response to spills based on time of day, a number of occupants presently within the store, a number of people proximal the spill, etc. For example, the robotic system can access store occupancy data to identify occupancy trends of a store based on time of day. In this example, the robotic system can detect a relatively high number of occupants within a store on Sunday evenings and a relatively low number of occupants within the store on Tuesdays at midnight when the store is closed (e.g., associates in the store restock shelves on Tuesday evenings). Therefore, the robotic system can prioritize urgency to respond to spills occurring between 5 p.m. and 7 p.m. on Sunday evening to limit the number of occupants exposed to the spill and therefore at risk for falling by slipping on the spill. However, the robotic system can deprioritize removal of spills (and/or other objects on the floor of the store, such as pallets and boxes) on Tuesday evenings after midnight while associates are restocking shelves due to the low number of occupants in the store and nature of restocking.

However, the robotic system can assign a time frame for responding to spills and/or prioritize removal of spills by any other means and in any other suitable way.

9.4 Local Robotic System Response

In one variation shown in FIG. 2, the remote computer system can dispatch the robotic system to a location adjacent the spill (or hazard) in order to alert patrons of the presence of the spill and in order to prompt these patrons to avoid the spill. In particular, after detecting a spill, the robotic system can remain in a location adjacent the spill—such as to block a path traversing the spill—and can then issue a series of audible prompts (e.g., an audible alarm) and/or visual prompts (e.g., blinking lights) to warn patrons nearby of the spill, such as until a store associate confirms removal of this spill and/or until the robotic system detects removal of the spill based on absence of thermal gradient in the corresponding region of a later thermal image.

In one implementation, the robotic system can identify a location adjacent a boundary of the spill and hold at this location in order to block physical access to the spill and thus encourage patrons to pass around the spill rather than traversing the spill. For example, the robotic system can: detect a perimeter of the spilled fluid in the area of the floor nearby, such as by extracting a perimeter of the thermal gradient depicting the spill from a thermal image of this floor area; autonomously navigate toward the perimeter of the fluid (but avoid crossing this perimeter into the spilled fluid); hold in the position proximal the perimeter of the spilled fluid in order to physically block access to this floor area; and output an indicator of presence of the spill, such as described below. The robotic system can then remain in this position near the spill until the robotic system (or the remote computer system): receives confirmation from a store associate that the spill has been cleared; receives confirmation from the store associate that an alternative warning infrastructure (e.g., a "Wet Floor" sign) has been placed near the spill; receives a prompt from the store associate to move away from the spill to enable manual cleanup; directly detects removal of the spill (e.g., based on absence of a thermal gradient in the corresponding location in a later thermal image); or directly detects placement of an alternative warning infrastructure nearby. Alternatively, the robotic system can autonomously navigate back and forth across an aisle in which the spill was detected in order to block access to the aisle.

While near the spill, the robotic system can also issue an audible alert (e.g., a siren, audible commands) or visible alert (e.g., flashing lights, a message on an integrated display) to alert associates and patrons of the spill. For example, the robotic system can flash lights and render a message that states "Avoid this area!" on an integrated display. Therefore, the robotic system can output an indicator of presence of the spilled fluid by rendering a notification of presence of the fluid nearby on a display integrated into the robotic system and by outputting an audible alert while holding (e.g., halting, remaining stopped) proximal the perimeter of the fluid.

In a similar implementation, the robotic system can cooperate with lighting and/or speaker infrastructure in the store (e.g., in shelving structures) to warn patrons to avoid the aisles or aisle segments proximal the spill. For example, in response to detecting a spill in "aisle 3" of the store, the robotic system (or the remote computer system) can trigger lights integrated into an endcap display at "aisle 3" to flash.

Alternatively, the robotic system can: flag the location of the spill, a time the spill was detected, etc.; serve a prompt to a store associate as described above; and then immediately resume autonomous execution of an inventory tracking routine or spill detection routine throughout the store. For example, the robotic system can: detect a perimeter of the fluid in the area of the floor of the store based on the thermal gradient in the thermal image; serve a prompt to clear the spill to a store associate; and then autonomously navigate around the spilled fluid at greater than a threshold distance (e.g., 20 centimeters) from the perimeter of the spill.

10. Confirming Correction

In one variation, the robotic system can receive inputs from the associate confirming removal of the spill from the floor of the store. In this variation, the robotic system can generate and store a task list representing outstanding corrective actions necessary to remove spills within the store. The robotic system can prioritize the task list by risk posed by each spill to patrons and/or other personnel, based on characteristics (e.g., size, shape, material), proximal the spill. In response to receiving confirmation (e.g., through manual entry into an associate portal rendered on a computing device) that an associate completed a task on the task list, the robotic system can clear the task from memory.

In one variation, the robotic system can return to the location of the spill and record additional thermal images, depth maps, and/or color images of the region to confirm removal of the spill from the floor of the store. In response to detecting removal of the spill, the robotic system can clear the spill from its cache and/or record a time at which the robotic system confirmed removal of the spill.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting and responding to hazards within a store comprising:
   at a robotic system, during a scan cycle:
      autonomously navigating toward an area of a floor of the store;
      recording a thermal image of the area of the floor;
      recording a depth map of the area of the floor;
      recording a color image of the area of the floor;
      detecting a thermal gradient in the thermal image;
      scanning a region of the depth map, corresponding to the thermal gradient detected in the thermal image, for a height gradient; and
      scanning a region of the color image, corresponding to the thermal gradient in the thermal image, for a color gradient;
   in response to detecting the thermal gradient in the thermal image and in response to detecting absence of the height gradient in the region of the depth map, predicting presence of a fluid within the area of the floor;
   identifying the fluid as clear in response to detecting absence of the color gradient in the region of the depth map; and
   in response to identifying the fluid as clear, serving a prompt to remove the fluid from the area of the floor of the store and identifying the fluid as a clear liquid to a computing device affiliated with the store.

2. The method of claim 1:
   further comprising:
      identifying an aisle of the store proximal the fluid based on a location of the area of the floor of the store;
      querying a planogram of the store for a list of products stocked in the aisle;
      in response to the list of products comprising a packaged oil product, predicting that the fluid comprises an oil;
   wherein serving the prompt to the computing device comprises:
      populating an electronic notification with the prompt to remove the fluid from the area of the floor;
      indicating the location of the area of the floor in the store in the electronic notification;
      inserting a recommendation for dry absorbent to remove the fluid into the electronic notification; and
      transmitting the electronic notification to the computing device affiliated with an associate of the store.

3. The method of claim 1:
   further comprising, during the scan cycle:
      autonomously navigating toward a second area of the floor of the store;
      recording a second thermal image of the second area of the floor;
      recording a second depth map of the second area of the floor;
      recording a second color image of the second area of the floor;
      detecting a second thermal gradient in the second thermal image;
      scanning a second region of the second depth map, corresponding to the second thermal gradient detected in the second thermal image, for a second height gradient; and
      scanning a second region of the second color image, corresponding to the second thermal gradient in the second thermal image, for a second color gradient;
   further comprising:
      in response to detecting the second thermal gradient in the second thermal image and in response to detecting absence of the second height gradient in the second region of the second depth map, predicting presence of a second fluid within the second area of the floor;
      identifying the second fluid as colored in response to detecting the second color gradient in the second region of the second color image; and
   wherein serving the prompt to the computing device comprises serving the prompt, to the computing device, further specifying removal of the second fluid from the second area of the floor of the store and identifying the second fluid as a colored liquid.

4. The method of claim 1:
   further comprising, during the scan cycle:
      estimating an opacity of the fluid, proportional to the color gradient;
      calculating a priority for removal of the fluid from the area of the floor of the store inversely proportional to the opacity of the fluid;
   wherein serving the prompt to the computing device comprises:
      inserting the prompt to remove the fluid from the area of the floor into an electronic notification;
      inserting the priority for removal of the fluid from the area of the floor into the electronic notification; and
      transmitting the electronic notification to the computing device affiliated with an associate of the store.

5. The method of claim 1, further comprising:
   detecting a perimeter of the fluid in the area of the floor of the store based on the thermal gradient in the thermal image;
   autonomously navigating toward the perimeter of the fluid;
   holding proximal the perimeter of the fluid; and
   outputting an indicator of presence of the fluid.

6. The method of claim 5:
   wherein holding proximal the perimeter of the fluid comprises holding proximal the perimeter of the fluid to physically block access to the area of the floor of the store; and
   wherein outputting the indicator of presence of the fluid comprises, while holding proximal the perimeter of the fluid:
      rendering a notification of presence of the fluid nearby on a display integrated into the robotic system; and
      outputting an audible alert.

7. The method of claim 1, further comprising:
detecting a perimeter of the fluid in the area of the floor of the store based on the thermal gradient in the thermal image; and
autonomously navigating around the fluid at greater than a threshold distance from the perimeter of the fluid.

8. The method of claim 1:
further comprising, during the scan cycle:
  autonomously navigating along a set of aisles within the store; and
  while autonomously navigating along a particular aisle in the set of aisles, recording a set of color images of a set of shelving structures facing the particular aisle;
wherein recording the thermal image comprises recording the thermal image at a first time while autonomously navigating along the particular aisle in the set of aisles;
wherein recording the depth map comprises recording the depth map at approximately the first time while autonomously navigating along the particular aisle; and
wherein serving the prompt to the computing device comprises serving the prompt, identifying the particular aisle in the set of aisles in the store, to the computing device.

9. The method of claim 8, further comprising:
detecting a first shelf in a first shelving structure in a first region of a first color image, in the set of color images, recorded at approximately the first time;
identifying an address of the first shelf;
based on the address of the first shelf, retrieving a first list of products assigned to the first shelf by a planogram of the store;
retrieving a first set of template images from a database of template images, each template image in the first set of template images comprising visual features of a product in the first list of products;
extracting a first set of features from the first region of the first color image;
determining that a unit of the first product is improperly stocked on the first shelf in response to deviation between features in the first set of features and features in the first template image; and
in response to determining that the unit of the first product is improperly stocked on the first shelf, generating a first restocking prompt for the first product on the first shelf.

10. The method of claim 1, further comprising:
identifying a first set of aisles, in a set of aisles within the store, assigned at least one product comprising a liquid by a planogram of the store;
identifying a second set of aisles, in the set of aisles within the store, assigned dry goods and excluding products containing fluids by the planogram of the store; and
at the robotic system:
  autonomously navigating along the first set of aisles within the store at a first frequency during the scan cycle; and
  autonomously navigating along the second set of aisles within the store at a second frequency during the scan cycle, the second frequency less than the first frequency.

11. The method of claim 1, further comprising:
accessing a history of locations of fluid spill events in the store;
based on the history:
  identifying a first aisle, in a set of aisles in the store, containing locations of a first quantity of historical fluid spill events over a period of time; and
  identifying a second aisle, in the set of aisles in the store, containing locations of a second quantity of historical fluid spill events, less than the first quantity of historical fluid spill events, over the period of time;
  based on the first quantity of historical fluid spill events, scheduling the robotic system to traverse the first aisle at a first frequency during the scan cycle; and
  based on the second quantity of historical fluid spill events, scheduling the robotic system to traverse the second aisle at a second frequency, less than the first frequency, during the scan cycle.

12. The method of claim 1, further comprising:
at the robotic system, during the scan cycle:
  autonomously navigating toward a second area of the floor of the store;
  recording a second thermal image of the second area of the floor of the store;
  recording a second depth map of the second area of the floor;
  detecting a second thermal gradient in the second thermal image; and
  scanning a second region of the second depth map, corresponding to the second thermal gradient detected in the second thermal image, for a second height gradient greater than a minimum height threshold; and
in response to detecting the second thermal gradient in the second thermal image and in response to detecting the second height gradient greater than the minimum height threshold in the second region of the second depth map:
  predicting presence of a hazardous object on the floor of the store and within the second area of the floor; and
  serving a second prompt to remove the hazardous object from the second area of the floor of the store to the computing device.

13. The method of claim 12, wherein predicting presence of the hazardous object on the floor of the store comprises predicting presence of the hazardous object on the floor of the store and within the second area of the floor in response to:
detecting the second thermal gradient in the second thermal image; and
detecting the second height gradient less than a maximum height threshold in the second region of the second depth map aligned with the second thermal gradient detected in the second thermal image.

14. The method of claim 1:
wherein scanning the region of the depth map for the height gradient comprises:
  projecting a floor plan of the store onto the depth map to isolate a segment of the depth map representing the floor of the store and excluding a fixed display near the area of the floor in the store;
  projecting a ground plane onto the segment of the depth map; and
  scanning the segment of the depth map for an object offset above the ground plane; and
wherein predicting presence of the fluid within the area of the floor comprises predicting presence of the fluid within the area of the floor in response to:
  detecting the thermal gradient in the thermal image; and detecting absence of the object offset above the ground plane in the segment of the depth map.

15. The method of claim 1:
further comprising:
after recording the thermal image of the area of the floor of the store, recording a sequence of thermal images depicting the area of the floor of the store;
scanning the sequence of thermal images for thermal gradients proximal the area of the floor of the store; and
characterizing a spatial rate of change of thermal gradients, proximal the area of the floor of the store, detected in the sequence of thermal images;
wherein predicting presence of the fluid within the area of the floor comprises predicting presence of the fluid within the area of the floor in response to:
detecting the thermal gradient in the thermal image;
the spatial rate of change of thermal gradients detected in the sequence of thermal images falling below a threshold rate of change; and
detecting absence of the height gradient in a segment of the depth map cospatial with the thermal gradient in the thermal image; and
further comprising identifying the thermal gradient in the thermal image as other than fluid in the area of the floor of the store in response to the spatial rate of change of thermal gradients detected in the sequence of thermal images exceeding the threshold rate of change.

16. The method of claim 15, wherein predicting presence of the fluid within the area of the floor comprises, in response to detecting the thermal gradient in the thermal image and in response to detecting absence of a height gradient in the region of the depth map:
extracting a profile of the thermal gradient from the thermal image;
passing the profile of the thermal gradient into a fluid spill classifier to calculate a confidence for presence of the fluid within the area of the floor; and
predicting presence of the fluid within the area of the floor in response to the confidence for presence exceeding a threshold value.

17. A method for detecting and responding to hazards within a store comprising:
at a robotic system, during a scan cycle:
autonomously navigating toward an area of a floor of the store;
recording a thermal image of the area of the floor;
recording a depth map of the area of the floor;
recording a color image of the area of the floor;
detecting a thermal gradient in the thermal image;
scanning a region of the depth map, corresponding to the thermal gradient detected in the thermal image, for a height gradient; and
scanning a region of the color image, corresponding to the thermal gradient in the thermal image, for a color gradient;
in response to detecting the thermal gradient in the thermal image and in response to detecting absence of the height gradient in the region of the depth map, predicting presence of a fluid within the area of the floor;
estimating an opacity of the fluid based on the color gradient;
calculating a priority for removal of the fluid from the area of the floor of the store inversely proportional to the opacity of the fluid;
inserting a prompt to remove the fluid from the area of the floor into an electronic notification;
inserting the priority for removal of the fluid from the area of the floor into the electronic notification; and
transmitting the electronic notification to the computing device affiliated with an associate of the store.

18. A method for detecting and responding to hazards within a store comprising:
accessing a history of locations of fluid spill events in the store;
based on the history:
based on a first quantity of historical fluid spill events occurring in a first aisle in a set of aisles in the store over a period of time, scheduling a robotic system to traverse the first aisle at a first frequency during a scan cycle; and
based on a second quantity of historical fluid spill events, less than the first quantity, occurring in a second aisle in the set of aisles in the store over the period of time, scheduling the robotic system to traverse the second aisle at a second frequency less than the first frequency during the scan cycle;
at the robotic system, during the scan cycle:
autonomously navigating toward an area of a floor of the store;
autonomously navigating along the second aisle at a second frequency, less than the first frequency, during the scan cycle,
recording a thermal image of an area of the floor in the store;
recording a depth map of the area of the floor;
detecting a thermal gradient in the thermal image;
scanning a region of the depth map, corresponding to the thermal gradient detected in the thermal image, for a height gradient; and
in response to detecting the thermal gradient in the thermal image and in response to detecting absence of the height gradient in the region of the depth map:
predicting presence of a fluid within the area of the floor; and
serving a prompt to remove the fluid from the area of the floor of the store to a computing device affiliated with the store.

19. The method of claim 18:
further comprising, during the scan cycle:
recording a color image of the area of the floor;
scanning a region of the color image, corresponding to the thermal gradient in the thermal image, for a color gradient;
further comprising identifying the fluid as clear in response to detecting absence of the color gradient in the region of the depth map; and
wherein serving the prompt to the computing device comprises serving the prompt, to the computing device, specifying removal of the fluid from the area of the floor of the store and identifying the fluid as a clear fluid.

* * * * *